(12) United States Patent
Todeschini et al.

(10) Patent No.: US 10,392,070 B2
(45) Date of Patent: Aug. 27, 2019

(54) SYSTEM FOR ASSISTING IN DRIVING A BICYCLE BY SENDING A HAPTIC FEEDBACK TO A CYCLIST

(71) Applicant: BLUEBRAKE S.R.L., Milan (IT)

(72) Inventors: Fabio Todeschini, Lecco (IT); Sergio Matteo Savaresi, Cremona (IT); Matteo Corno, Milan (IT); Giulio Panzani, Monza (IT); Matteo Pasquini, Pasturo (IT); Alessio Nicolò Cota, San Giuliano Milanese (IT)

(73) Assignee: Blubrake S.r.l., Milan (IT)

( * ) Notice: Subject to any disclaimer, the term of this patent is extended or adjusted under 35 U.S.C. 154(b) by 0 days.

(21) Appl. No.: 16/074,785

(22) PCT Filed: Dec. 12, 2016

(86) PCT No.: PCT/IB2016/057525
§ 371 (c)(1),
(2) Date: Aug. 2, 2018

(87) PCT Pub. No.: WO2017/134500
PCT Pub. Date: Aug. 10, 2017

(65) Prior Publication Data
US 2019/0039674 A1    Feb. 7, 2019

(30) Foreign Application Priority Data

Feb. 4, 2016 (IT) .......................... 102016000011532

(51) Int. Cl.
*B62J 99/00*    (2009.01)
*B62L 3/02*    (2006.01)
(Continued)

(52) U.S. Cl.
CPC ................. *B62J 99/00* (2013.01); *B60Q 9/00* (2013.01); *B62J 27/00* (2013.01); *B62K 23/02* (2013.01);
(Continued)

(58) Field of Classification Search
CPC .... B62J 99/00; B62J 27/00; B62J 2099/0013; B62J 2099/002; G01C 21/3652;
(Continued)

(56) References Cited

U.S. PATENT DOCUMENTS 10,102,724 B2 * 10/2018 Baumann ............... B62K 23/06
2010/0186538 A1   7/2010 Tetsuka
(Continued)

FOREIGN PATENT DOCUMENTS

EP    2617637 A1 *  7/2013 ............. B62M 6/50
EP    2617637 A1    7/2013
(Continued)

OTHER PUBLICATIONS

International Search Report & Written Opinion in PCT/IB2016/057525 dated Mar. 9, 2017.

*Primary Examiner* — Mohamed Barakat
(74) *Attorney, Agent, or Firm* — Manelli Selter PLLC; Edward J. Stemberger (57) ABSTRACT

System for assisting in driving a bicycle by sending a haptic feedback to a cyclist having means for detecting the current value of a target quantity (q, v); and a memory module configured for supplying an optimal value of the target quantity ($q_{max}$; $v_{max}$) corresponding to the current spatial position (x) of the bicycle along the predetermined path or corresponding to the current instant (t). A comparator module is configured for determining a quantity representative of the error ($e_q$; $e_v$) between said current value of the target quantity (q, v) and said optimal value of the target quantity (Continued)

($q_{max}$; $v_{max}$) supplied by the memory module. An actuator is applicable to a portion of the bicycle (100), suitable for generating vibrations. A control module is configured for determining a vibration frequency (f) of the actuator based on the error ($e_q$; $e_v$), wherein the said vibration implements the haptic feedback to the cyclist.

13 Claims, 6 Drawing Sheets

(51) Int. Cl.
*B60Q 9/00* (2006.01)
*B62J 27/00* (2006.01)
*B62K 23/02* (2006.01)
*G01C 21/36* (2006.01)

(52) U.S. Cl.
CPC ............ *B62L 3/02* (2013.01); *G01C 21/3652* (2013.01); *B60Q 9/002* (2013.01); *B60Q 9/008* (2013.01); *B62J 2099/002* (2013.01); *B62J 2099/0013* (2013.01)

(58) Field of Classification Search
CPC ........ B60Q 9/002; B60Q 9/008; B62K 23/02; B62L 3/02
See application file for complete search history.

(56) References Cited

U.S. PATENT DOCUMENTS

| | | | |
|---|---|---|---|
| 2011/0133918 A1 | 6/2011 | Lee | |
| 2012/0083705 A1* | 4/2012 | Yuen | A61B 5/0002 600/508 |
| 2016/0221627 A1* | 8/2016 | Hines | B62H 5/20 |

FOREIGN PATENT DOCUMENTS

| | | |
|---|---|---|
| KR | 20130051662 A | 5/2013 |
| TW | M507370 U | 8/2015 |
| WO | 2014205345 A2 | 12/2014 |

* cited by examiner

SYSTEM FOR ASSISTING IN DRIVING A BICYCLE BY SENDING A HAPTIC FEEDBACK TO A CYCLIST

TECHNICAL FIELD OF THE INVENTION

The object of the present invention is a system for assisting in driving a bicycle by means of a haptic feedback, in particular a system suitable for providing information to the cyclist on a target quantity—either a kinematic parameter of the bicycle, such as speed, or a parameter depending on the cyclist's effort, such as, for example, his delivered power or his heart rate—by means of a haptic feedback, in particular a vibration, so that the cyclist can change his behavior according to the information given by the system.

PRIOR ART

Systems carrying out an active control of the bicycle parameters are known. Typical examples are the brake control systems, which, in case of slip of one wheel, act on the brakes, modulating braking and removing the slip conditions.

Passive brake control systems have also been proposed. The Italian patent application n. 102015000025510 describes a system that provides a haptic feedback, in particular that generates a vibration to alert the cyclist to the slip condition of one wheel or to incipient flipping over of the bicycle. Once the cyclist senses the vibration, he acts on braking, modulating it. Said system, which demands a simultaneous monitoring of the front and rear wheel speed, is all the same limited to a passive control of the slip or of the flipping over of the bicycle.

SUMMARY OF THE INVENTION

The problem at the basis of the present invention is to make available a passive driving assistance system of a bicycle, which enables the cyclist to change his behavior based on the trend of a generic target quantity.

This and other aims are achieved by means of a system for assisting in driving a bicycle by sending a haptic feedback to the cyclist according to claim 1.

Said system, for example, can be used by a racing cyclist, while training, to reach limits, for example in terms of subjective endurance or performance; or even by an amateur cyclist who wants to ride his bicycle safely, for example in the presence of steep slopes or streets wet with rain.

The dependent claims define possible advantageous embodiments of the invention.

BRIEF DESCRIPTION OF THE FIGURES

To better understand the invention and appreciate its advantages, some of its non-limiting exemplary embodiments will be described below, referring to the attached figures, wherein.

DESCRIPTION OF THE INVENTION EMBODIMENTS

With reference to the appended figures, systems for assisting in driving a bicycle by sending a haptic feedback to the cyclist will be described in detail, according to some possible alternative embodiments of the invention. Further variations, not described, are however possible, as it will be explained later.

Figure 1:
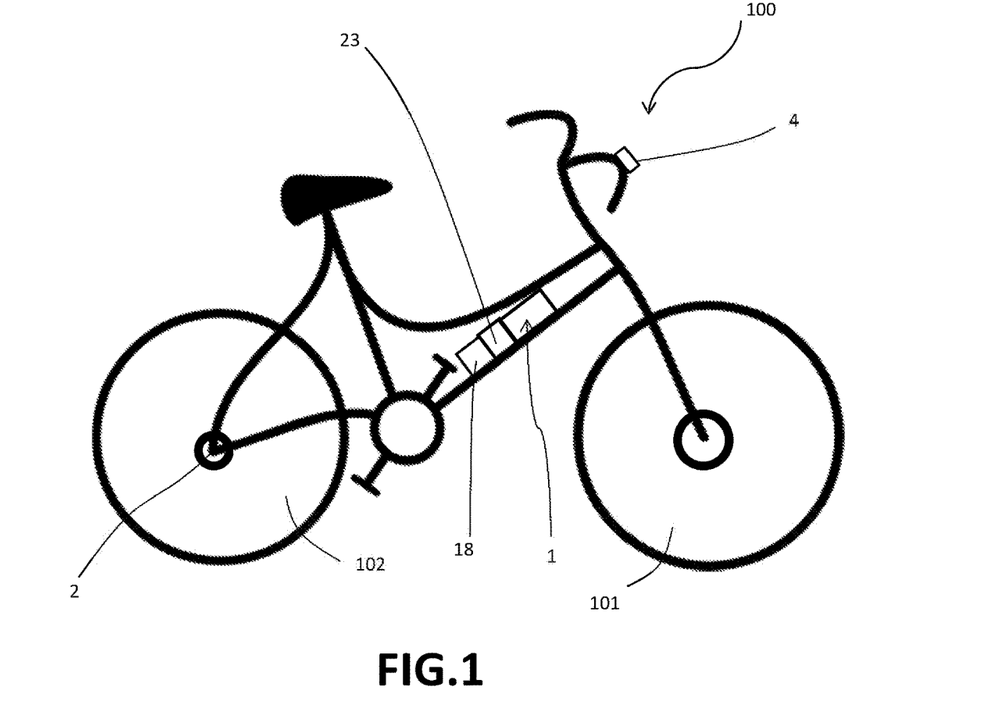
FIG. 1 is a schematic view of a bicycle provided with a system for assisting in driving the bicycle itself by sending a haptic feedback to the cyclist according to a possible embodiment of the invention.

Referring to FIG. 1, a bicycle is indicated as a whole with reference 100. Bicycle 100 comprises a first 101 and a second 102 wheel, for example corresponding to the front and to the rear wheel respectively. A brake is associated with at least one of the wheels and it can be actuated, for example, by means of a lever positioned on the handlebars. The braking system can be of any known type, for example V-brake or disc-brake, controlled by a mechanical system, such as a cable, or by a hydraulic system.

Figure 7:
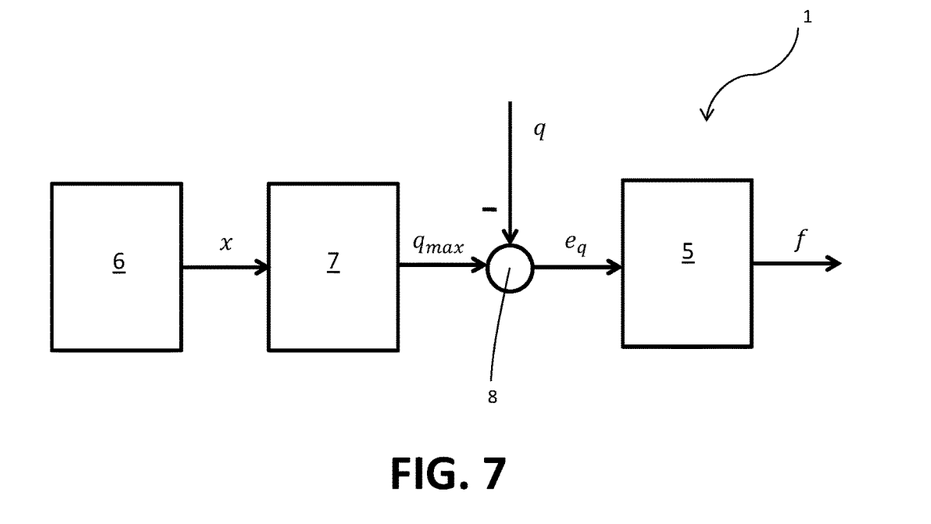
FIG. 7 is a block diagram of the system for assisting in driving a bicycle by sending a haptic feedback to the cyclist in accordance with a further possible embodiment of the invention.
Figure 8:
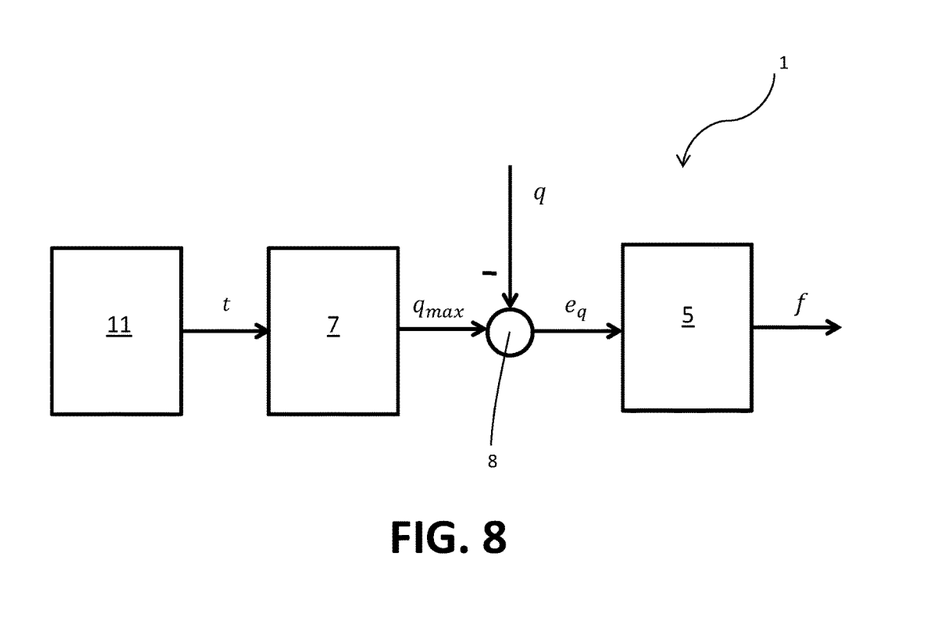
FIG. 8 is a block diagram of the system for assisting in driving a bicycle by sending a haptic feedback to the cyclist in accordance with a further possible embodiment of the invention.
Figure 9:
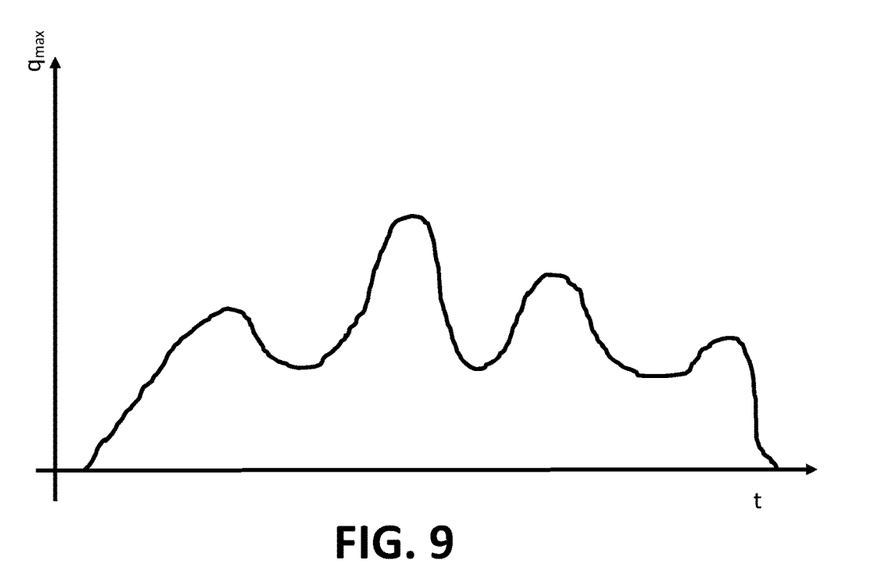
FIG. 9 shows a possible trend of a generic target quantity q as a function of time t.

Bicycle 100 comprises a system 1 for assisting in driving the bicycle by sending a haptic feedback to the cyclist. As explained afterwards, system 1 monitors a target quantity and, depending on its trend in space or time, it provides to the cyclist a vibratory haptic feedback, which makes the cyclist change his behavior. Different kinds of said monitored quantity can be used, and, consequently, a different set of sensors will be attached to the bicycle. In the exemplary embodiments shown in FIGS. 3 to 6, the target quantity monitored by system 1 is the speed of the bicycle itself. The bicycle shown in FIG. 1 is equipped with sensors corresponding to said embodiments of system 1. However, as shown later, even a different generic target quantity q can alternatively be monitored, such as for example the pedaling power delivered by the cyclist or his heart rate. This general situation is illustrated in FIGS. 7-9.

With reference now to the exemplary cases of FIGS. 3-6, in case the monitored quantity is the speed v of the bicycle, system 1 comprises a sensor 2 for measuring the angular speed w of one of the two wheels 101 and 102. For example, in FIG. 1, sensor 2 is associated with the rear wheel 102. Sensor 2 is suitable to generate a signal representing said angular speed ω. Starting from the signal, representing the angular speed ω of the wheel, it is generally possible to determine the bicycle speed v, assuming that the wheel is not slipping, using the relation v=ω·R, where R is the wheel radius, sensor 2 is associated to.

In addition, system 1 may further comprise an inertial measurement unit 18 suitable for measuring at least one of the longitudinal ax, lateral ay and vertical az accelerations, the roll ωx, pitch ωy and yaw ωz angular speeds of the bicycle and for generating signals representative of the same. The inertial measurement unit 18 can help to determine the bicycle speed v in case the information provided by sensor 2 is not true, for example in case of slip of the wheel, sensor 2 itself is associated to. For example, it is possible to compare the acceleration obtained from the wheel speed (using the relation a=ω̇·R) with the longitudinal acceleration ax, provided by the inertial measurement unit. If the wheel is slipping, the acceleration a has an outlier in comparison with the acceleration ax. Therefore, when this outlier signals that the wheel is slipping, the speed can be calculated by integrating the longitudinal acceleration ax over limited time intervals.

Furthermore, as shown afterwards, according to a variation of the invention, the inertial measurement unit can be used to determine a spatial position of the bicycle along a predetermined path.

System 1 further comprises an actuator 4 suitable to produce vibrations. For example, the actuator 4 may comprise an eccentric mass, which produces vibrations when rotating. The actuator 4 is applicable to a bicycle part so that, as the actuator vibrates, the vibrations are perceived by the cyclist. Preferably, the actuator 4 is applied on a brake lever of one of the wheels.

Figure 2A:
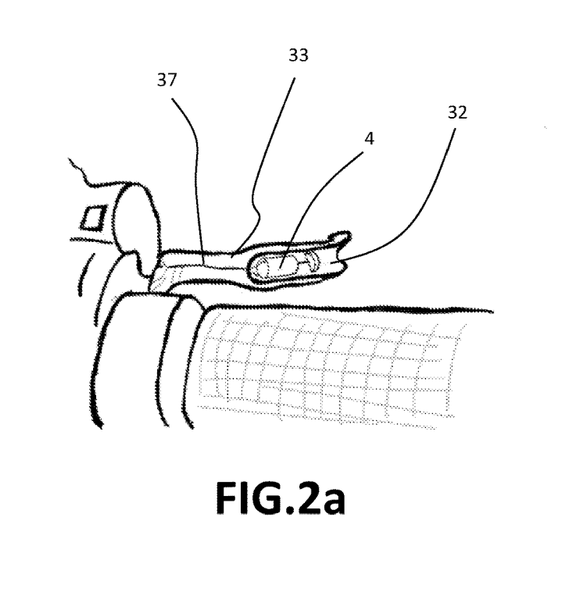
FIGS. 2a and 2b are two schematic views of possible locations of a system actuator on the brake lever of a bicycle, respectively a mountain bike and a racing bike.
Figure 2B:
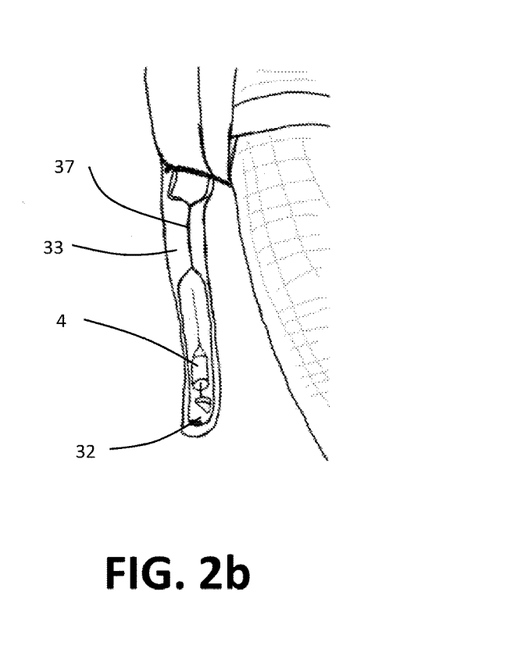

With reference to FIGS. 2a and 2b, respectively representing a detail of the handlebars of a mountain bike and of a racing bike, the actuator 4 can be housed, for example, inside a groove 32, generally present in the rear part of the brake lever 33. The actuator 4 can be located inside the groove 32, for example with a housing not shown in the figures, configured so as to close the groove 32 in order to protect the actuator 4 from atmospheric agents, as well as to avoid the cyclist's hand coming in contact with the actuator 4 itself. By its housing, the actuator 4 is made integral to the brake lever 33. The actuator 4 is supplied and controlled by means of electrical wires 37.

The actuator 4 is preferably a brushed DC type and can be voltage or current controlled, as explained afterwards.

The actuator 4 is preferably associated with a battery 23, for its power supply and handling.

Figure 3:
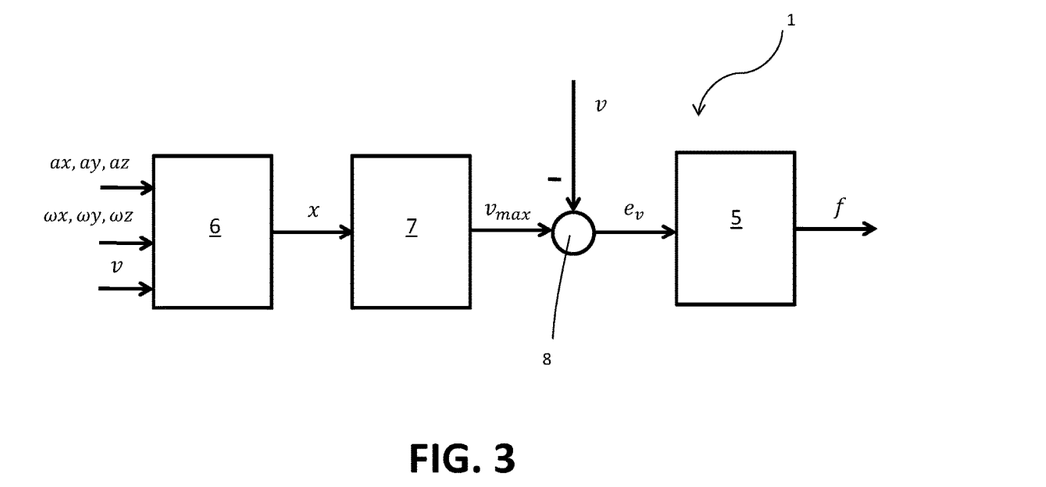
FIG. 3 is a block diagram of the system for assisting in driving a bicycle by sending a haptic feedback to the cyclist in accordance with a possible embodiment of the invention.

Referring now to the embodiment in FIG. 3, system 1 comprises a control module 5 suitable for generating a command signal to the actuator 4 so that the latter vibrates with a certain vibration frequency f. The methods for determining the vibration frequency f will be described afterwards.

System 1 further comprises a module 6 for determining the position x of the bicycle along a predetermined path. The position along the predetermined path, which is set a priori, can be determined, for example, based on the coordinates (cartesian or polar) with respect to an origin that, for example, may coincide with the origin of the path itself. Preferably the coordinates are spatial, so as to consider also the path height. The predetermined path, for example, may be a road definable on a map (such as Google Maps or similar maps). The position x can be determined, for example, by proper algorithms based on odometry, known per se, using the bicycle speed v as input quantity. According to these known algorithms, the bicycle position along the predetermined path is determined by numerical integration of speed v. In addition, it is also potentially possible to take advantage of the signals from the inertial measurement unit for a more precise estimation. In fact, determining the position from the simple integration of speed v, can lead to incorrect estimations due to small errors in measuring speed v and said errors have been accumulated during the integration in time. The use of the inertial measurement unit signals, as shown, allows obtaining a more accurate measurement of speed, so that it is less subject to errors. Moreover, the measurements of the accelerations and of the angular speeds allow recognizing each single curve in the predetermined path. The signals coming from the inertial measurement unit then can be used to determine the bicycle position along the predetermined path, as an alternative to the algorithm based on odometry, or in addition to it, to get a more accurate estimation.

Figure 4:
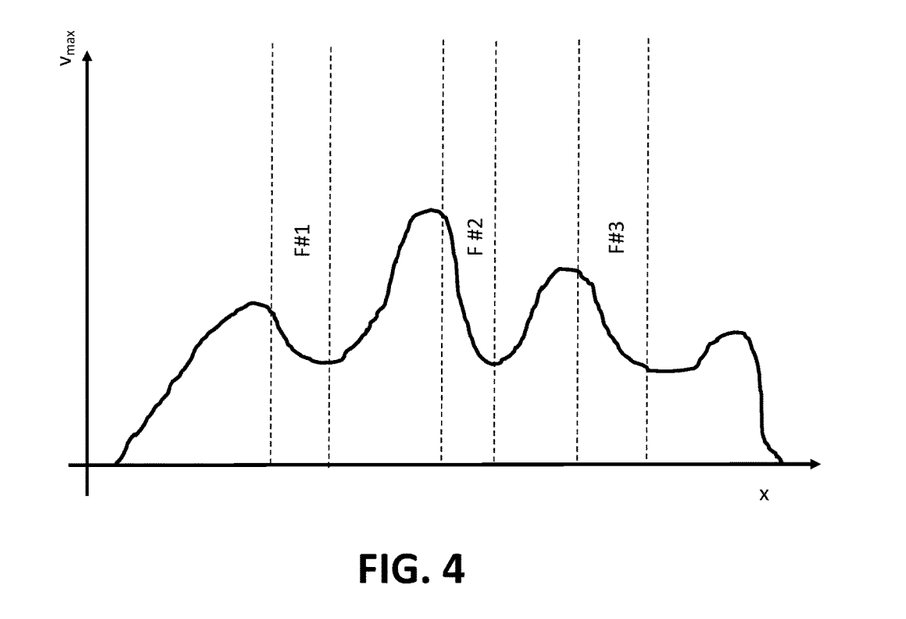
FIG. 4 shows a possible trend of a target speed v as a function of a spatial position x along a predetermined path.

System 1 further comprises a memory module 7, wherein a target speed profile is stored or storable as a function of the position along the predetermined path. For example, once the path to follow is known, the target speed may represent the maximum speed for driving along the whole path. The maximum speed can be defined, for example, taking into account the slope conditions in the path segments, the bending radius of the curves, the type of asphalt, the asphalt surface conditions (dry or wet). The racing cyclist, for example, can take advantage of the target speed for his training (in this case the target speed can represent a limit to reach) or alternatively by an amateur cyclist, who in general reaches lower performance levels, but who wants to drive along the path safely, avoiding risky situations. FIG. 4 shows a possible example of the trend of the target speed $v_{max}$ as a function of the position x along the predetermined path. The segments corresponding to the portions F#1, F#2 and F#3 represent braking, for example in the presence of curves, where the target speed decreases. The curve of the target speed can be set by the user or may alternatively be automatically generated based on the cyclist's needs (for example: training mode or safe-riding mode) and based on the path characteristics (for example: slopes, bending radius of the curves, type of asphalt, dry or wet surface conditions).

Returning to FIG. 3, the memory module 7 receives at the input the current position x along the predetermined path, as provided by module 6, and gives at the output the target speed $v_{max}$, corresponding to said current position based on the stored profile.

System 1 further comprises a comparator module 8 configured for comparing the target speed $v_{max}$, provided by module 7, and the effective speed v of the bicycle in the position x along the predetermined path, as detected by the available sensors. The comparison, for example, may be expressed as a speed error $e_v$, as follows:

$$e_v = (v_{max} - v)/v_{max}$$

The speed error $e_v$ is the input quantity in the control module 5, which, according to said speed error, determines the frequency f, the actuator 4 should have in order to send haptic feedback to the cyclist, and generates a corresponding command signal for the actuator 4. Considering its definition, the speed error $e_v$ will be a percentage error in the range 0-1 (that is between 0% and 100%).

Figure 5:
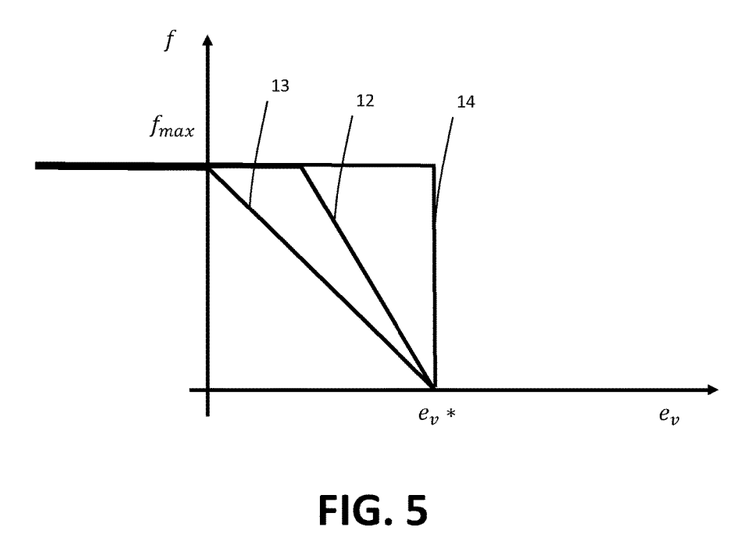
FIG. 5 shows a possible trend of a vibration frequency f as haptic feedback, linked to an error $e_v$ between a target speed and an effective speed.

In FIG. 5 a possible trend of the actuator frequency f is represented, as a function of the speed error $e_v$. According to said example, frequency f varies between 0 and a maximum value $f_{max}$. In case the error $e_v$ is negative, i.e. in case the effective speed v is greater than the target speed $v_{max}$, the vibration frequency is equal to the maximum frequency $f_{max}$. This condition corresponds in fact to maximum danger or to an overshoot of the optimal condition and therefore the cyclist will perceive a high frequency vibration.

On the contrary, if the error $e_v$ is positive, i.e. if the current speed v is lower than the target speed $v_{max}$, the vibration frequency f is modulated and tends to decrease, when it gets far from the limit situation, i.e. when the effective speed v decreases compared to the target speed $v_{max}$, until it becomes null, upon reaching a threshold value $e_v^*$ of the speed error. According to the variations shown in FIG. 5, frequency f is constant and equal to the maximum frequency $f_{max}$ as long as the effective speed v remains close to the target speed $v_{max}$; then it linearly decreases to the threshold value $e_v^*$ (curve 12) or it can linearly decrease from the maximum frequency $f_{max}$ starting from a condition error $e_v$ null, while the latter increases, up to the threshold value $e_v^*$ (curve 13). According to a further variation, frequency f is kept constant and equal to the maximum frequency $f_{max}$ as long as the error $e_v$ is below the threshold value $e_v^*$ (curve 14).

The threshold value $e_v^*$, based on the definition given of the speed error $e_v$, will be a number in the range 0-1 (i.e. between 0% and 100%). For example, if the threshold value $e_v^*$ is equal to 0.1 (i.e. 10%), frequency f will be null and therefore the actuator will not vibrate, as long as the speed v will be between 0% and 90% of the optimal value $v_{max}$; when speed v will exceed 90% of the optimal value $v_{max}$, the system will make the actuator vibrate following the previously explained methods.

Figure 6:
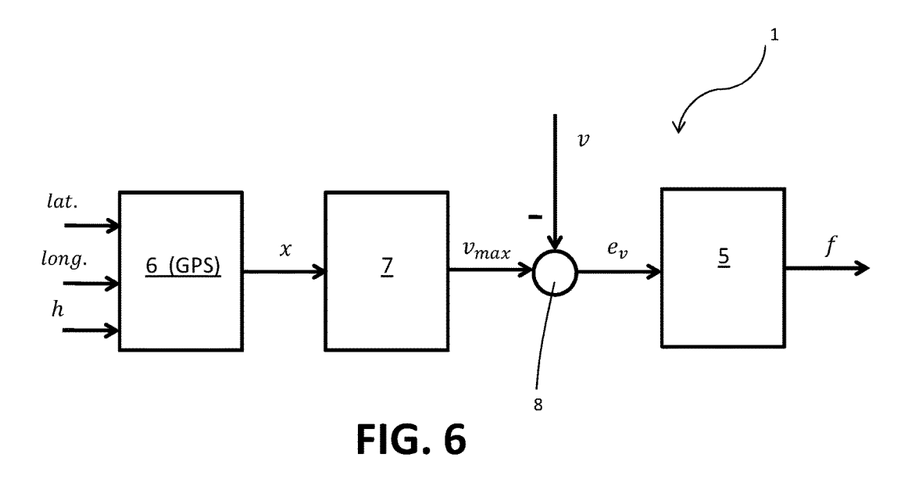
FIG. 6 is a block diagram of the system for assisting in driving a bicycle by sending a haptic feedback to the cyclist in accordance with a further possible embodiment of the invention.

In FIG. 6, a block diagram of system 1 is represented in accordance with a further possible embodiment of the invention. The system in FIG. 6 differs from the system according to the embodiment of FIG. 3 for the configuration of module 6, which determines the position x. In this case, module 6 is a GPS module, suitable for determining the position x of the bicycle along the predetermined path depending on the latitude ("lat."), the longitude ("long.") and the height ("h"), detected by the GPS module 6 itself. According to said embodiment, the inertial measurement unit 18 can be optionally used, depending on the method followed to determine the bicycle speed v. The other modules represented correspond to the modules described with reference to FIG. 3 and are configured in a similar way.

In the embodiments described so far, system 1 compares the effective speed v with a target speed $v_{max}$, determined according to a predetermined profile that relates the target speed itself to the bicycle position x.

However, system 1 may monitor target quantities of a different kind, alternative to speed, to determine the vibration frequency f. Said quantities are compared with the effective value of such quantity along the predetermined path. Depending on the target quantity taken into account, system 1 can comprise means for detecting such quantity, different from the speed sensor and/or from the inertial measurement unit.

For example, a possible alternative target quantity is the power delivered by the cyclist. Said quantity is given by the product of the torque exerted by the cyclist on the bicycle pedals and the angular speed of the pedals themselves. In order to measure the cyclist's power, a sensor for detecting the torque and a sensor for detecting the angular speed of the pedals can be used. Even in this case, the effective power p is compared with a target power $P_{max}$, for which a profile has been predetermined as a function of the bicycle position x along the predetermined path. The haptic feedback will be a function of the error $e_p$ between the target power $P_{max}$ and the effective power P.

A further target quantity, alternative to speed or to power, is the cyclist's heart rate, detectable by means of a special heart rate sensor applicable to the cyclist himself. Obviously, it is possible to consider target quantities different from those explicitly mentioned.

In FIG. 7 a block diagram of system 1 is shown, configured for monitoring a generic target quantity q, for which an optimal profile is predetermined as a function of the position x along the predetermined path. According to this embodiment, module 6, which can alternatively be configured following the embodiment description in FIG. 3 or the one in FIG. 6, determines the bicycle position x along the predetermined path. The optimal profile of the generic target quantity (which, as previously explained, may correspond, for example, to the bicycle speed, to the cyclist's power or heart rate)—as a function of the position x along the predetermined path—is stored in the memory module 7. The memory module 7, then, based on the position x determined by module 6, provides the optimal value of the target quantity $q_{max}$, corresponding to the position x. The comparator module 8 compares the effective value of the target quantity q with the optimal value $q_{max}$, provided by module 7, and determines an error $e_q$, which can be defined as follows:

$$e_q = (q_{max} - q)/q_{max}$$

Then the control module 5 determines the actuator vibration frequency f based on said error $e_q$, following, for example, the logic described with reference to the embodiments of FIG. 3 and FIG. 6. Even in this case, for determining the vibration frequency, a threshold value $e_q^*$ of the target quantity error may be set in the range 0-1 (i.e. between 0% and 100%).

According to a further possible variation of the invention, system 1 may not have the module 6 for determining the position x of the bicycle along the predetermined path and may be configured to compare the effective value of the generic target quantity q (again, for example: the bicycle speed, the cyclist's pedaling power, the cyclist's heart rate) with an optimal value $q_{max}$ defined this time, not as a function of the position x along a predetermined path, but as a function of time t. Said possible further embodiment of the invention is schematically shown in FIG. 8. According to this variation, the module for determining the position is absent and system 1 alternatively comprises a counter module 11, which measures time t from a predetermined instant that may correspond, for example, to the beginning of the path driven by the bicycle. An optimal profile of the target quantity $q_{max}$ is stored in the memory module 7, but this time it is not a function of the position x, but of time t. An example of said profile is shown in FIG. 9. The memory module 7 provides the optimal value $q_{max}$ corresponding to the considered instant t. Then system 1 acts by analogy with the description given with reference to the embodiment of FIG. 7. The comparator module 8 compares the effective value of the target quantity q with the optimal value $q_{max}$, provided by module 7 and determines an error $e_q$, which can be defined as follows:

$$e_q = (q_{max} - q)/q_{max}$$

The control module 5 then determines the vibration frequency f of the actuator 4 based on said error $e_q$, for example following the logic described with reference to the embodiments of FIG. 3 and FIG. 6. Even in this case, for determining the vibration frequency, a threshold value $e_q^*$ can be set between 0 and 1 (i.e. between 0% and 100%).

Said variation of the invention is particularly suitable for monitoring the target quantities indicative of the cyclist's effort. For example, if the target quantity corresponds to the pedaling power or to the heart rate, the optimal curve can be defined to calibrate the cyclist's effort on a predetermined time interval, to avoid that the cyclist gets too soon tired with respect to the expected total duration. When the cyclist is making too much effort (so if he is delivering too much power or if his heart rate is too fast), the vibration of the actuator 4 will warn him that he has to reduce the effort to be within the range of the optimal values.

With reference to the actuator 4, it may alternatively be voltage or current controlled.

In case the actuator 4 is voltage controlled, it is enough to change the power supply voltage according to the determined vibration frequency. Based on said variation, therefore, system 1 comprises a module for the voltage control of the actuator (not shown in the figures) that receives in the input the command signal (in this case the signal representative of the frequency f supplied by the module 5) and consequently supplies the actuator 4 with a proper voltage so that the actuator vibrates at the determined vibration frequency.

Figure 10:
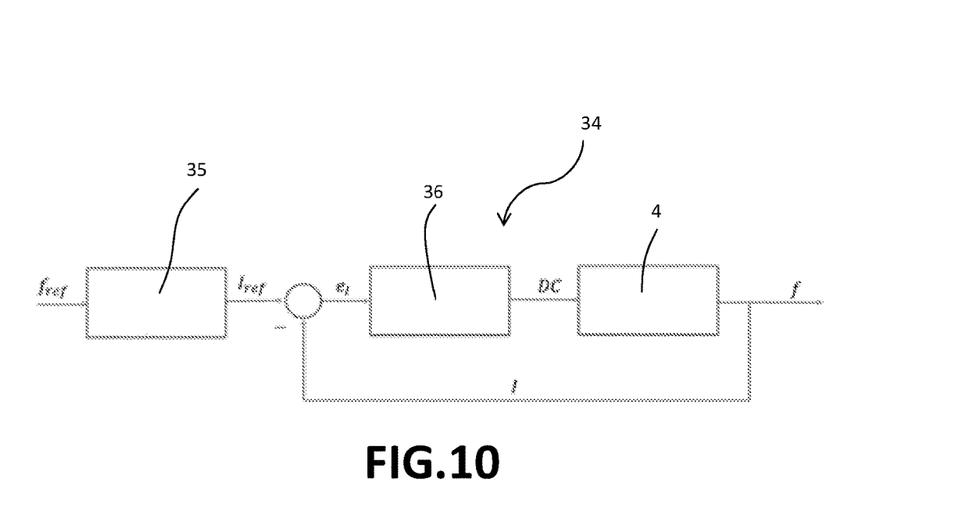
FIG. 10 is a block diagram of a module for the current control of the system actuator for assisting in driving a bicycle by sending a haptic feedback according to a possible embodiment of the invention.

According to a further variation, in case the actuator 4 is current controlled, system 1 comprises a module 34 for the current control of the actuator, schematically shown in FIG. 10.

According to this variation, module 34 receives the input signal representative of the desired vibration frequency, determined through the previously described methods and indicated, in this case, as a reference frequency $f_{ref}$.

Figure 11:
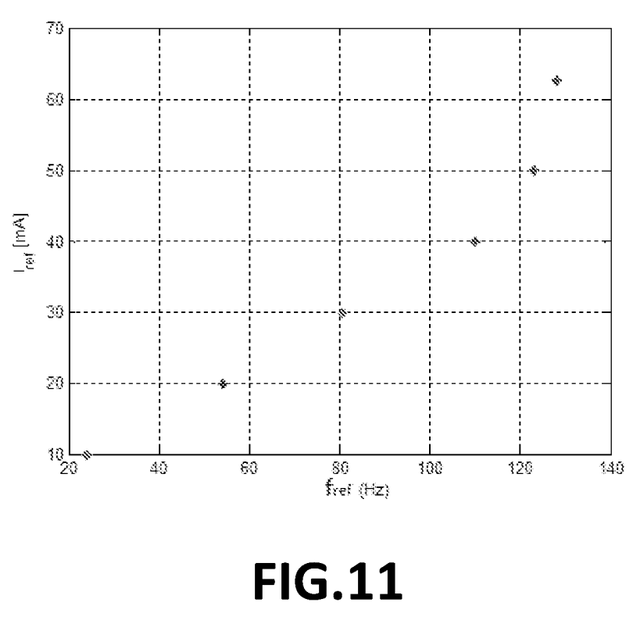
FIG. 11 is a diagram illustrating a possible relation between a reference frequency $f_{ref}$ and a reference current $I_{ref}$ for the current control of the actuator of the system for assisting in driving a bicycle by sending a haptic feedback according to a possible embodiment of the invention.

The module 34 comprises a memory module 35, wherein a static map is stored. Said map links the reference vibration frequency $f_{ref}$ to a reference current $I_{ref}$. An example of said static map is shown in FIG. 11. At the output of the memory module 35 a reference current $I_{ref}$ is then obtained, corresponding to the reference vibration frequency $f_{ref}$.

The module 34 then performs a closed loop control of the actuator 4 current. To this purpose, the module 34 comprises a current sensor that measures the effective motor current I, from which it is possible to determine a current error $e_I$ between the reference current $I_{ref}$ and the effective current I.

The module 34 further comprises a voltage command module 36, which determines the DC (Duty Cycle) voltage to be applied to the actuator 4 so that the current error $e_I$ is minimized, namely so that the effective current I substantially follows the trend of the reference current $I_{ref}$. This setting of current I makes the actuator 4 vibrate at an effective frequency f that tends to follow the reference frequency $f_{ref}$ trend.

This current control method, in general, ensures faster response times than the voltage control method and further prevents excessive currents from passing into the actuator 4.

Note that, in the present description and in the appended claims, system 1 as well as the elements indicated as "module" can be implemented by means of hardware devices (e.g. control units), by software or by a combination of hardware and software.

The skilled person, in order to satisfy specific contingent requirements, may make several additions, modifications or replacements of elements with other functionally equivalent to the described embodiments of the system for assisting in driving a bicycle by sending a haptic feedback to a cyclist, without however departing from the scope of the appended claims.

The invention claimed is:

1. System for assisting in driving a bicycle by sending a haptic feedback to a cyclist, comprising:
   means for detecting the current value of a target quantity (q; v);
   a memory module wherein an optimal profile of said target quantity is stored or storable, as a function of a spatial position (x) of the bicycle along a predetermined path, or as a function of time (t), configured for supplying an optimal value of the target quantity ($q_{max}$; $v_{max}$) corresponding to the current spatial position (x) of the bicycle along the predetermined path or corresponding to the current instant (t);
   a comparator module configured for determining a quantity representative of the error ($e_q$; $e_v$) between said current value of the target quantity (q; v) and said optimal value of the target quantity ($q_{max}$; $v_{max}$) supplied by the memory module;
   an actuator applicable to a portion of the bicycle, suitable for generating vibrations;
   a control module configured for determining a vibration frequency (f) of the actuator, based on said error ($e_q$; $e_v$) between the current (q; v) and the optimal values ($q_{max}$; $v_{max}$) of the target quantity and for generating a command signal of the actuator so that the actuator vibrates at said vibration frequency (f), wherein said vibration implements the haptic feedback to the cyclist,
   wherein said quantity representative of the error between the current value of the target quantity (q; v) and the optimal value of the target quantity ($q_{max}$; $v_{max}$) is calculated by the comparator module, based on the following relation:

$$e_q = (q_{max} - q) / q_{max}$$

wherein:
   q is the current value of the target quantity;
   $q_{max}$ is the optimal value of the target quantity, and
   wherein said vibration frequency (f) is settable by the control module between a maximum value ($f_{max}$) and a value equal to 0, so that:
   the vibration frequency (f) is equal to the maximum frequency ($f_{max}$) if the current value of the target quantity (q, v) is greater than the optimal value of the target quantity ($q_{max}$; $v_{max}$);
   the vibration frequency (f) gradually or instantaneously decreases as the current value of the target quantity (q, v) decreases in comparison with the optimal value of the target quantity ($q_{max}$; $v_{max}$), until it becomes zero when the target quantity error ($e_q$) reaches a threshold value $e_q^*$ in the range 0-1.

2. System according to claim 1, wherein said target quantity is the bicycle speed and said means for detecting the current value of the target quantity comprise an angular speed sensor suitable for being coupled to a wheel of the bicycle and for generating a signal representative of its angular speed (ω).

3. System according to claim 2, wherein said means for detecting the target quantity comprise an inertial measurement unit suitable for measuring at least one of the longitudinal (ax), lateral (ay) and vertical accelerations (az), the roll (ωx), pitch (ωy) and yaw (ωz) angular speeds of the bicycle and for generating signals representative of the same.

4. System according to claim 1, wherein said target quantity is the cyclist's pedaling power and said means for detecting the current value of the target quantity comprise a torque sensor, suitable for being coupled to a pedaling system of the bicycle and for generating a signal representative of the torque applied to the bicycle pedaling system, and an angular speed sensor suitable for being coupled to the bicycle pedaling system and for generating a signal representative of the speed of the bicycle pedaling system.

5. System according to claim 1, wherein said target quantity is the cyclist's heart rate and said means for detecting the current value of the target quantity comprise a heart rate sensor suitable for being applied to the cyclist and for generating a signal representative of the cyclist's heart rate.

6. System according to claim 1, wherein an optimal profile of said target quantity is stored or storable in said memory module as a function of the bicycle spatial position (x) along a predetermined path; the memory module, configured for supplying the optimal value of the target quantity ($q_{max}$; $v_{max}$) corresponding to the current spatial position (x) of the bicycle along the predetermined path, wherein system further comprises a module for determining the bicycle spatial position (x) along said predetermined path.

7. System according to claim 3, wherein an optimal profile of said target quantity is stored or storable in said memory module as a function of the bicycle spatial position along a predetermined path; the memory module, configured for supplying the optimal value of the target quantity ($q_{max}$; $v_{max}$) corresponding to the current spatial position (x) of the bicycle along the predetermined path, wherein the system further comprises a module for determining the bicycle spatial position (x) along said predetermined path, and wherein said module for determining the spatial position of the bicycle along a predetermined path is configured for determining said bicycle spatial position (x) along the predetermined path based on said signal representative of the angular speed ($\omega$) of the bicycle wheel and/or based on said signals representative of the longitudinal (ax), lateral (ay) and vertical (az) accelerations and of the roll ($\omega x$), pitch ($\omega y$) and yaw ($\omega z$) angular speeds of the bicycle.

8. System according to claim 6, wherein said module for determining the bicycle spatial position along a predetermined path is a GPS module, adapted to detect the current latitude, longitude and height and to determine the bicycle spatial position (x) along the predetermined path based on said current latitude, longitude and height.

9. Bicycle comprising the system for assisting in driving the bicycle itself by sending a haptic feedback to the cyclist according to claim 1.

10. Bicycle according to claim 9, comprising a brake lever, wherein said actuator is configured for vibrating at a vibration frequency (f) so as to supply said vibratory haptic feedback to the cyclist through said brake lever.

11. Bicycle according to claim 10, wherein said actuator is housed in a rear groove of said brake lever.

12. System for assisting in driving a bicycle by sending a haptic feedback to a cyclist, comprising:
   means for detecting the current value of a target quantity (q; v);
   a memory module wherein an optimal profile of said target quantity is stored or storable, as a function of a spatial position (x) of the bicycle along a predetermined path, or as a function of time (t), configured for supplying an optimal value of the target quantity ($q_{max}$; $v_{max}$) corresponding to the current spatial position (x) of the bicycle along the predetermined path or corresponding to the current instant (t);
   a comparator module configured for determining a quantity representative of the error ($e_q$; $e_v$) between said current value of the target quantity (q; v) and said optimal value of the target quantity ($q_{max}$; $v_{max}$) supplied by the memory module;
   an actuator applicable to a portion of the bicycle, suitable for generating vibrations;
   a control module configured for determining a vibration frequency (f) of the actuator, based on said error ($e_q$; $e_v$) between the current (q; v) and the optimal values ($q_{max}$; $v_{max}$) of the target quantity and for generating a command signal of the actuator so that the actuator vibrates at said vibration frequency (f), wherein said vibration implements the haptic feedback to the cyclist,
   further comprising a module for the current control of the actuator, comprising:
   a memory module suitable for supplying, at the output, a reference current ($I_{ref}$) starting from the actuator command signal based on a static map stored in the memory module itself, which correlates said reference current ($I_{ref}$) with the actuator vibration frequency (f);
   a current sensor suitable to measure an effective current (I) of the motor;
   a voltage command module adapted to determine a voltage (DC) to be applied to the actuator so that the latter is supplied by a predetermined current;
   wherein said module for the current control of the actuator is configured so to determine a current error ($e_I$) between the reference current ($I_{ref}$) and the effective current (I) and said voltage command module is configured so to determine the voltage to be applied to the actuator so that the actuator effective current (I) follows the trend of the reference current and therefore said current error ($e_I$) is minimized.

13. Bicycle comprising the system for assisting in driving the bicycle itself by sending a haptic feedback to the cyclist according to claim 12.

* * * * *